United States Patent
Holland et al.

[11] Patent Number: 5,472,802
[45] Date of Patent: Dec. 5, 1995

[54] SEALED HYDRIDE BATTERIES, INCLUDING A NEW LID-TERMINAL SEAL AND ELECTRODE TAB COLLECTING COMB

[75] Inventors: Art Holland, Bloomfield Hills; Kevin Dean; Donn Fillmore, both of Waterford, all of Mich.

[73] Assignee: Ovonic Battery Company, Inc., Troy, Mich.

[21] Appl. No.: 140,933

[22] Filed: Oct. 25, 1993

[51] Int. Cl.$^6$ .................................................. H01M 2/12
[52] U.S. Cl. .................... 429/54; 429/161; 429/181; 429/184; 29/623.2
[58] Field of Search ........................ 429/181, 184, 429/54, 56, 161; 29/623.2

[56] References Cited

U.S. PATENT DOCUMENTS

| | | | |
|---|---|---|---|
| 1,433,680 | 10/1922 | Ford | 429/161 |
| 4,523,376 | 6/1985 | Thibault | 429/184 X |
| 4,783,383 | 11/1988 | Machida et al. | 429/181 X |
| 4,975,341 | 12/1990 | Tucholski et al. | 429/54 X |
| 5,158,842 | 10/1992 | McHenry | 429/161 |
| 5,171,647 | 12/1992 | Dean et al. | 429/54 |
| 5,258,242 | 11/1993 | Dean et al. | 429/54 |

*Primary Examiner*—Stephen Kalafut
*Attorney, Agent, or Firm*—Marc J. Luddy; Marvin Siskind; David Schumaker

[57] ABSTRACT

A sealed battery case comprising: a case of formable metal; a lid for the case, the lid having an annular shroud defining the periphery of at least one opening; at least one terminal having a sealing lip at its circumference; where the terminal is crimp sealed into said annular shroud. Also described is a method of attaching a terminal in a lid opening of a battery case; the opening having an opening and an annular shroud surrounding the opening. The annular shroud is of an inner diameter slightly larger than the diameter of the opening and extending outward from the lid, and the terminal has a diameter smaller than the diameter of the opening and a sealing lip around its circumference. The sealing lip has a diameter in between the diameter of the opening and the diameter of the shroud; the method comprising the steps of: placing a seal of an insulating material; around the sealing lip; inserting the terminal into the shroud; and crimping the shroud around the seal.

8 Claims, 4 Drawing Sheets

SEALED HYDRIDE BATTERIES, INCLUDING A NEW LID-TERMINAL SEAL AND ELECTRODE TAB COLLECTING COMB

FIELD OF THE INVENTION

The present invention relates generally to improvements for metal hydride batteries. More specifically, this invention relates to an improved terminal for a battery that is crimped around a seal and connected to the electrode tabs via a comb.

BACKGROUND OF THE INVENTION

Rechargeable prismatic batteries are used in a variety of industrial and commercial applications such as fork lifts, golf carts, uninterruptable power supplies, and electric vehicles.

Rechargeable lead-acid batteries are presently the most widely used type of battery. Lead-acid batteries are a useful power source for starter motors for internal combustion engines. However, their low energy density, about 30 wh/kg makes them an impractical power source for an electric vehicle. An electric vehicle using lead acid batteries has a range of only about 30 to 120 miles before requiring recharge. Lead acid batteries require about 6 to 12 hours to recharge and contain large amount of toxic materials. In addition, electric vehicles using lead-acid batteries have sluggish acceleration, top speeds of only 50 to 60 mph, and a battery lifetime of only about 20,000 miles.

Nickel metal hydride batteries ("Ni-MH batteries") are far superior to lead acid batteries, and Ni-MH prismatic batteries are the most promising type of battery available for electric vehicles. For example, Ni-MH batteries, such as those described in U.S. patent application No. 07/934,976 now U.S. Pat. No. 5,277,999 to Ovshinsky and Fetcenko, the disclosure of which is incorporated herein by reference, have a much better energy density than lead acid batteries: they can power an electric vehicle over 250 miles before requiring recharge, they can be recharged in less than one hour, and they contain no toxic materials. Electric vehicles using Ni-MH batteries will have an acceleration of 0–60 in 8 seconds, a top speed of 100 mph, and a battery lifetime of more than about 100,000 miles.

Most Ni-MH batteries use nickel hydroxide positive electrodes and hydrogen storage negative electrodes. The electrodes are separated by non-woven, felted, nylon or polypropylene separators. The electrolyte is usually an alkaline electrolyte, for example, containing 20 to 45 weight percent potassium hydroxide.

Ni-MH batteries were previously classified based on whether they used $AB_2$ or $AB_5$ alloys as the hydrogen storage material of the negative electrode. The distinction between $AB_2$ or $AB_5$ alloys has disappeared as they have evolved. Both types of material are discussed in detail in U.S. Pat. Nos. 5,096,667 and 5,104,617 and U.S. patent application Nos 07/746,015 (now U.S. Pat. No. 5,238,756) and 07/934,976. The contents of all these references are specifically incorporated by reference. $AB_2$ alloys are now commonly referred to as Ovonic alloys.

Simply stated, in the $AB_5$ alloys, like the Ovonic alloys, as the degree of modification increases, the role of the initially ordered base alloy is of minor impodance compared to the properties and disorder attributable to the particular modifiers. In addition, analysis of the present multiple component $AB_5$ alloys indicates that these alloys are modified following the guidelines established for Ovonic alloy systems. Thus, highly modified $AB_5$ alloys are the same as Ovonic alloys. Both Ovonic alloys and $AB_5$ alloys are disordered materials characterized by multiple components and multiple phases. Both are thus multicomponent and multiphase alloys between which there no longer exists any significant distinction.

In electric vehicles, the weight of the batteries is a significant factor because battery weight is the largest component of the weight of the vehicle. For this reason, reducing the weight of individual batteries is a significant consideration in designing batteries for electric powered vehicles. In addition to reducing the weight of the batteries, the reliability of the specific components of the battery need to be improved. One particular area in need of improvement is the electrode-terminal-external connector area.

Most prismatic batteries presently in use are vented batteries that operate at around 16 psi and require constant maintenance. In contrast, Ni-MH prismatic batteries using Ovonic alloys are designed as a sealed, maintenance free system. These batteries operate at around 100 psi.

Presently, in prismatic electric vehicle batteries, the battery terminals are solid, cast, cylindrically shaped and formed from copper or a copper alloy. The terminals are routinely threaded male ends that are screwed into the battery case lid. To insure that the terminal forms the required pressure seal between the case lid and the terminal, an O-ring seal is commonly placed between two plastic washers and this combination placed between the terminal and the case lid. The tabs of the battery's electrodes are then bolted to the bottom of the terminals, thereby making the required electrical connections. The external electrical connection to other batteries or to the final battery leads is made by bolting the connectors to the terminals.

Terminals in prismatic batteries as they presently exist are heavy and expensive because they are solid cast metal, threaded into the lid. It would be difficult to significantly reduce the weight of such terminals without effecting their structural integrity. Also, the terminals have a tendency to loosen when used in an environment in which the batteries are subjected to physical vibration, such as in electric vehicles. Loosening can result in unwanted venting of cell gases and shorting of the terminal to the battery case.

Electrode tabs (i.e. the internal electrical connectors between the battery electrode plates and the battery terminals) are gathered together and physically bolted to their respective battery terminals. The space required for bolting necessitates a minimum required overhead space (head space) between the tops of the battery electrode plates and the top of the battery case. This requires a length of battery case and a length of electrode tab material both of which add to the weight of the battery without a corresponding increase in battery storage capacity. An additional drawback is that vibrational loosening of the bolts which connect the electrodes to the terminals can cause high resistance pathways, reducing performance.

Present batteries are also expensive to manufacture. This is due to the number of parts they contain, as well as the time involved in assembling the component parts into the final product. Finally, heat generated during charge and discharge can become significant in Electric Vehicle (EV) batteries because it increases the degradation of electrodes, separators, and electrolytes, thereby reducing the life of the battery.

Thus, there exists the need for a battery design in which the electric connection components are resistant to the negative effects of a high vibration environment in a manner that reduces the overall weight of the battery without reducing its energy storage capacity, increases the batteries' reliability, and decreases the cost.

SUMMARY OF THE INVENTION

The present invention is designed to reduce the cost of large battery terminals by reducing the number of parts required and by simplifying the terminal design so that the terminal can be rapidly attached using high speed equipment. In addition, the present invention is designed to give better volumetric energy density by reducing the amount of head space in the battery and to give better heat dissipation through the use of higher surface area materials. Finally, terminals of the present invention give sure electrical connection with the electrode tabs without the need of bolting collected tabs onto the terminal.

These and other goals of the invention are satisfied by a sealed battery case comprising: a case of formable metal; a lid for the case, the lid having an annular shroud defining the periphery of at least one opening; at least one terminal having a sealing lip at its circumference; where the terminal is crimp sealed into the at least one opening by the annular shroud.

These goals are also satisfied by a method of attaching a terminal in a lid opening of a battery case; the opening having an annular shroud surrounding it, the annular shroud having an inner diameter slightly larger than the diameter of the opening and extending outward from the lid, the terminal having a diameter smaller than the diameter of the opening and having a sealing lip around its circumference, the sealing lip having a diameter sized between the diameter of the opening and the diameter of the shroud; the method comprising the steps of: placing a seal of an insulating material; around the sealing lip; inserting the terminal into the shroud; and crimping the shroud around the seal.

DETAILED DESCRIPTION OF THE INVENTION

Figure 1:
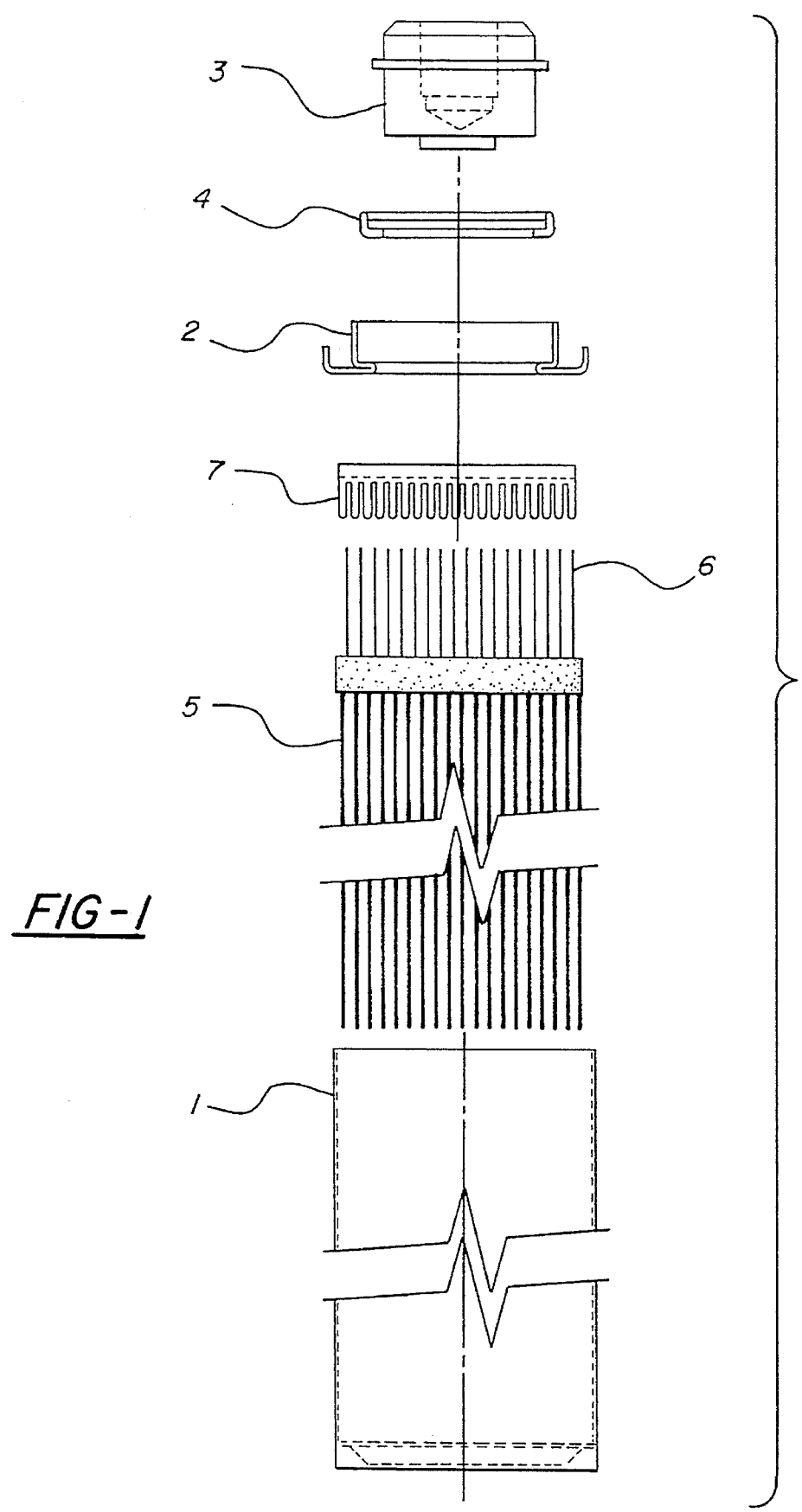
FIG. 1, is an exploded view of an electrochemical cell of the present invention incorporating the improved terminals/seals and electrode tab collecting comb.

FIG. 1, is an exploded view of the battery of the present invention. Specifically, this battery includes a case which is composed of a case 1 and a lid 2. (Like numbers are used to refer to like parts throughout this application.) The case is formed of a material which is chemically inert to the battery chemistry. For use in Ni-MH batteries, a stainless steel, such as 304L stainless steel, is preferred. Alternatively, plastic or a composite material can be used. Within the case 1, positive and negative battery electrodes form the electrode stack 5. The positive electrodes are preferably formed from a nickel hydroxide material and the negative electrodes are preferably formed from a hydrogen absorbing alloy. Preferably, the negative electrode material is an Ovonic alloy.

Each of the electrodes which form the electrode stack 5 have electrical connector tabs 6 attached to them. These tabs 6 are used to transport the current created in the electrochemical cell to the battery terminals 3. The tabs 6 are attached to an electrode tab collector comb 7 which is attached to the battery terminals 3. The terminal 3 is crimp sealed into the lid 2, using seal 4 to form a non-conductive pressure seal.

Figure 2:
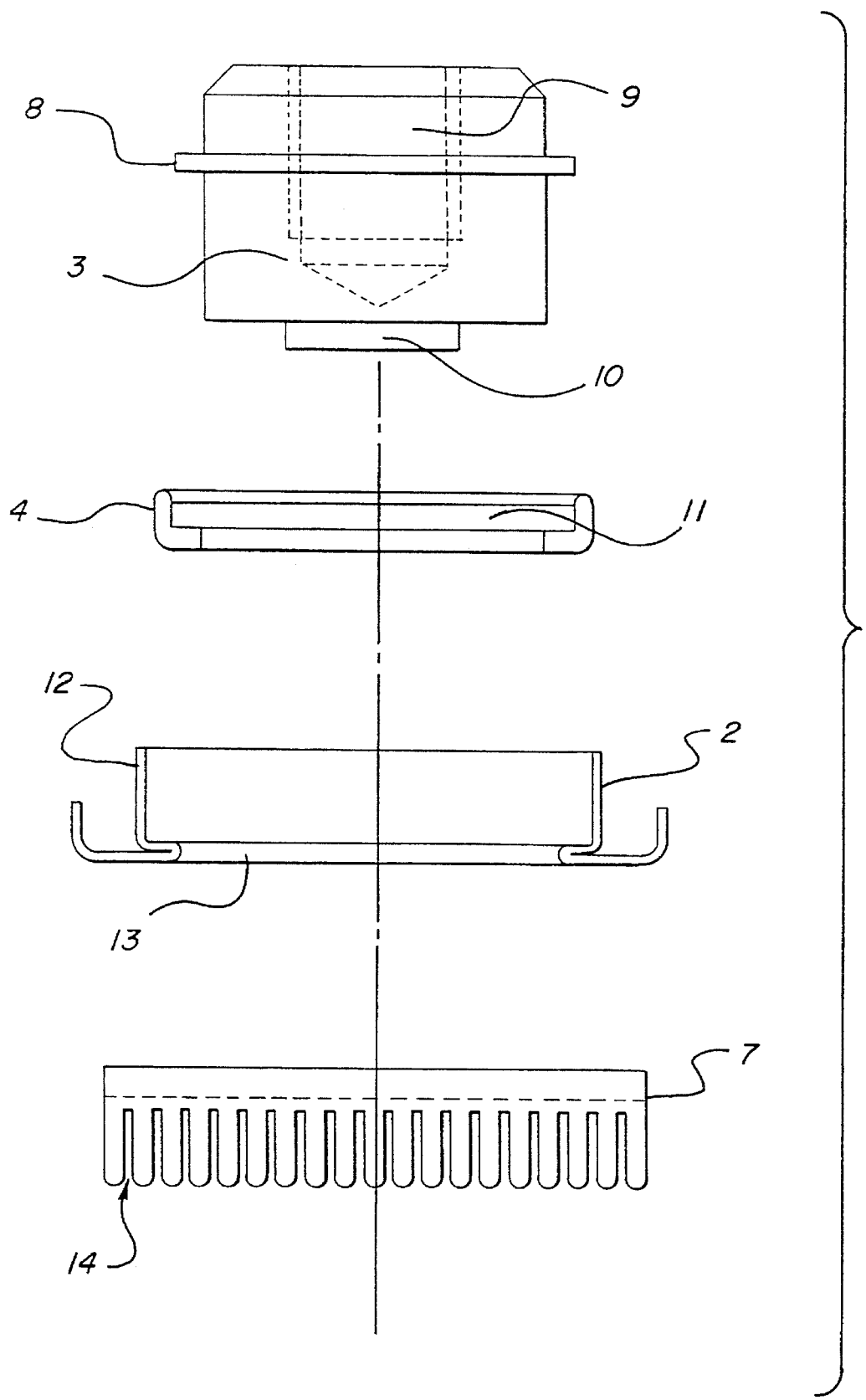
FIG. 2, is an enlarged view of a portion of FIG. 1, showing the battery terminal, sealing ring, case lid and electrode tab collecting comb.

FIG. 2, is an enlarged, exploded, not-to-scale view of a portion of the battery of the present invention. FIG. 2 shows the case lid 2, the terminal 3, the seal 4, and the comb 7.

The terminal 3, is typically formed from a copper or copper alloy material. However, any electrically conductive material which is compatible with the battery chemistry may be used. The terminal 3 includes a sealing lip 8 which assists in sealing the terminal 3 to the lid 2, using the seal 4. The terminal 3 also includes an axially aligned central opening 9.

The central opening 9 serves many purposes. It serves to reduce the weight of the battery. It serves as an opening into which an external connector may be friction fit. That is a cylindrical or annular battery lead connector may be friction fit into the central opening 9 to provide an external electrical connection to the battery. Finally, it serves as the location for a pressure release vent for venting excessive pressure from the interior of the battery. The opening 9 can extend partially through (if it is intended to serve only as a connector socket) or all the way through (if it is intended to contain a pressure vent and serve as a connector socket) the terminal 3.

The terminal 3 may also include a protrusion 10. This protrusion can be used to electrically and physically connect the terminal 3 to the comb 7. The connection can be press fit, welded or brazed as needed.

The seal 4 is typically a sealing ring. The seal includes a sealing lip slot 11 into which the sealing lip 8 of the terminal 3 is fit. This slot 11 helps to form a good pressure seal between the terminal 3 and the lid 2 and to keep the seal 4 in place when the terminal 3 is crimped into the lid 2. The seal 4 is preferably formed of an elastomeric, dielectric, hydrogen impermeable material, such as, for example, polysulfone.

The lid 2 includes at least one opening 13, through which the terminal 3 is in electrical communication with the comb 7. The diameter of opening 13 is slightly larger than the outer diameter of the terminal 3, but smaller than the outer diameter of the seal 4. The lid 2 also includes a shroud 12 surrounding opening 13 and extending outward from the lid 2. The shroud 12 has an inner diameter slightly larger than the outer diameter of the seal 4. The shroud 12 is crimped around the seal 4 and the sealing lip 8 of the battery terminal 3, to form an electrically non-conductive pressure seal between the terminal 3 and the lid 2. The crimp terminal seal of the present invention provides vibration resistance when compared to the threaded seal of the prior art.

The present invention is directed toward prismatic batteries that are sealed, particularly Ni-MH batteries using Ovonic alloys. Large prismatic batteries of the prior art are primarily vented systems such as lead-acid and nickel-zinc. Such systems do not require pressure seals or high pressure vents because they operate at around 16 psi as opposed to the approximately 100 psi of Ni-MH batteries. In addition, because vented prismatic batteries require maintenance, such as periodic watering, their components are not designed to operate without adjustment or maintenance during their operational life. Even if they were, the 200 cycle/20,000 mile operational life of prior art prismatic batteries is much less than the 1,000 cycle/100,000 mile operational life of Ovonic Ni-MH batteries.

The comb 7 provides a vibration resistant connector for transferring electrical energy from the electrodes to the terminals 3. The comb 7 includes electrode tab collecting slots 14. The electrode tabs 6 in FIG. 1 are friction fit into the slots 14, and the comb is attached to the terminals 3. The comb 7 provides greater vibration resistance compared to the prior art method of bolting the collected tabs to the bottom of the terminal 3. The prior art method of connecting the tabs to the terminal 3 also requires longer tabs and a longer case (a case having a greater head space). This adds to the total weight of the batteries. The absence of bolts significantly reduces the head space of the battery resulting in an increase in the volumetric energy density.

The comb 7 is preferably formed from copper or a copper alloy. However, as with the battery terminals 3, the comb 7 may be formed from any electrically conductive material which is compatible with the chemistry of the battery.

Figure 3:
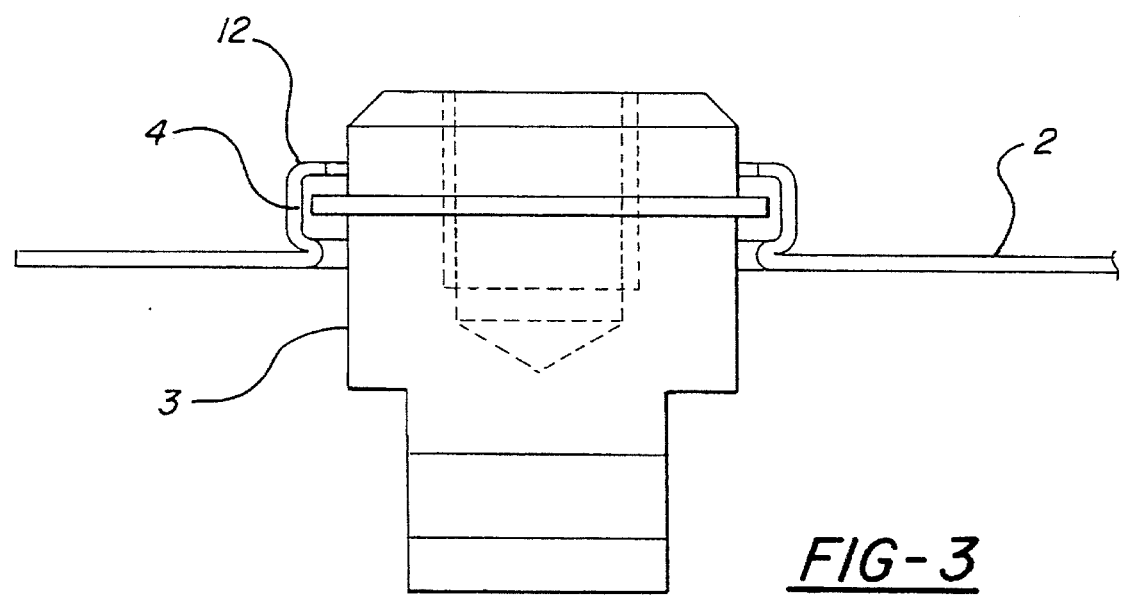
FIG. 3, is a partial cross-section of a portion of the cell of the present invention, showing the battery terminal and the sealing ring crimp sealed into the shroud of the case lid.

FIG. 3, shows a portion of the electrochemical cell of the present invention specifically depicting the fashion in which the battery terminal 3 is crimp sealed into the lid 2. From this figure, it can be clearly determined how the shroud 12 of the lid 2 is crimp sealed around the seal 4 which is, in turn, sealed around the sealing lip of the battery terminal 3. In this manner a vibration resistant pressure seal is formed.

The method of attaching the terminal 3 to the lid 2 involves crimp sealing the terminal to the lid. This crimp sealing method has a number of advantages over the prior art. Crimp sealing can be done rapidly on high speed equipment leading to a direct cost reduction. In addition, this method uses less material than the prior art which reduces the weight of the terminals resulting in an indirect cost reduction. The higher surface area of this design coupled with the decreased weight of the materials also results in increased heat dissipation from the terminals. The crimp sealed terminals of the present invention are limited to larger prismatic batteries because such batteries have enough space for the terminals and the seals. However, it is envisioned that the invention could be applied to small chewing gum style batteries, also. Yet another advantage of the present invention is that it permits forming the battery case and other parts from any malleable material and specifically does not require laser sealing, special ceramic to metal seals, or special (and thereby expensive) methods of any kind. In addition, the overall number of parts and the need for highly machined precisely fabricated parts are eliminated.

Figure 4:
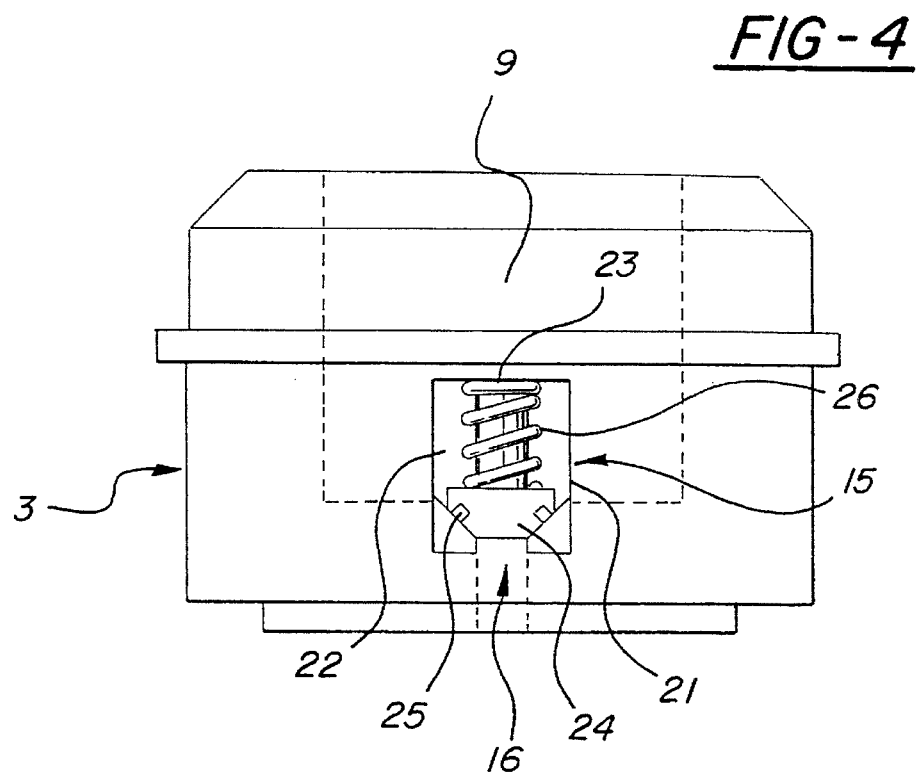
FIG. 4, is a cross-sectional view of an embodiment of the improved battery terminal of the present invention, showing how a pressure release valve may be placed in the battery terminal of the present invention.

FIG. 4 illustrates an alternative embodiment of the battery terminal 3 of the present invention. This particular embodiment includes a pressure release vent 15 incorporated into the axially aligned centrally located opening 9 of the battery terminal 3. This pressure release vent 15 consists of a vent housing 21 having a hollow interior area 22 in gaseous communication with the surrounding atmosphere and the interior of said case via an opening 23. A pressure release piston 24 is positioned within the hollow interior area 22. The pressure release piston 24 is sized to seal the vent opening 16 (also referred to as the axial opening 16). The pressure release piston 24, has a seal grove 25 on its surface opposite the axial opening 16. The seal groove 25 contains a seal (such as an O-ring) mounted in it. The seal groove is configured to encapsulate all but one surface of the seal thereby, leaving the non-encapsulated surface of the seal exposed. A compression spring 26 is positioned to urge the pressure release piston 24 to compress the seal in the seal groove and block the vent or axial opening 16 in the terminal. The interior of the electrochemical cell communicates with the exterior atmosphere via a vent opening 16 in the battery terminal 3, through a pressure release valve 15. Preferably, the pressure release vent 15 is a piston/O-ring/spring type valve as disclosed in commonly owned application Ser. No. 08/014,965, filed Feb. 8, 1993, which issued as U.S. Pat. No. 5,258,242 on Nov. 2, 1993 entitled "ELECTROCHEMICAL CELL HAVING IMPROVED PRESSURE VENT", the disclosure of which is incorporated by reference.

This patent describes an electrochemical cell having a pressure vent that comprises a vent housing having a hollow interior area in gaseous communication with said surrounding atmosphere and the interior of the battery case to which it is attached via at least one opening. A pressure release piston is positioned within the hollow interior area. This pressure release piston is sized to surround the gas outlet and has a seal groove configured to encapsulate all but one surface of a seal mounted within the seal groove. This configuration leaves the non-encapsulated surface of the seal exposed. A compression spring that urges the pressure release piston to compress the seal in the seal groove and block the opening between the interior of the case and the surrounding atmosphere is also present in the vent housing.

Figure 5:
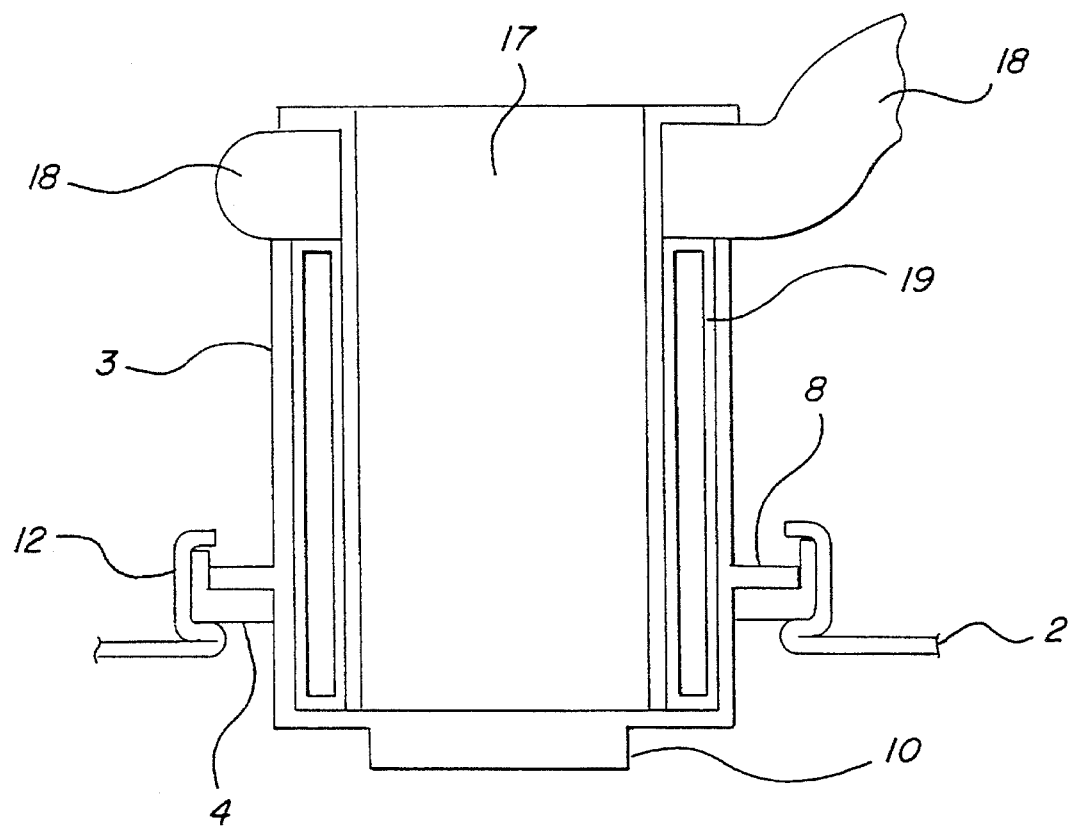
FIG. 5, is a cross-sectional view of another embodiment of the terminal of the present invention, showing an external battery lead connector friction fit into the hollow interior of the terminal.

Another alternative embodiment of the battery terminal 3 is presented in FIG. 5. FIG. 5 shows a terminal 3 into which an external battery lead connector 17 is friction fit. The connector 17 is attached to an external battery lead 18. Lead 18 may be any of the type typically known in the art such as a solid bar; a metal ribbon; a single or multi strand wire; or a braided, high current, battery cable. Preferably the lead connector 17 is a hollow annular barrel connector which is friction fit into the axially aligned central opening of battery terminal 3. The lead connector 17 is tightly held into the battery terminal 3 via a barrel connector web 19. A solid barrel connector is described in U.S. Pat. No. 4,657,335, dated Apr. 14, 1987 and U.S. Pat. No. 4,734,063, dated Mar. 29, 1988, each to Koch et al. and entitled "RADIALLY RESILIENT ELECTRICAL SOCKET," the disclosure of which is incorporated by reference. The terminal 3 is sealed into the case lid 2 by crimping shroud 12 around the seal 4 and sealing lip 8. The battery terminal 3 includes lip 10, which is used to connect the terminal physically and electrically to the electrode tab collecting comb.

If desired, the embodiments presented in FIGS. 4 and 5 may be combined into a single embodiment which incorporates both the pressure vent and the external battery lead connector. In addition, a rupture disk, that is a non-resealable means of releasing excess pressure, can be included instead of or in addition to the pressure vent.

Figure 6:
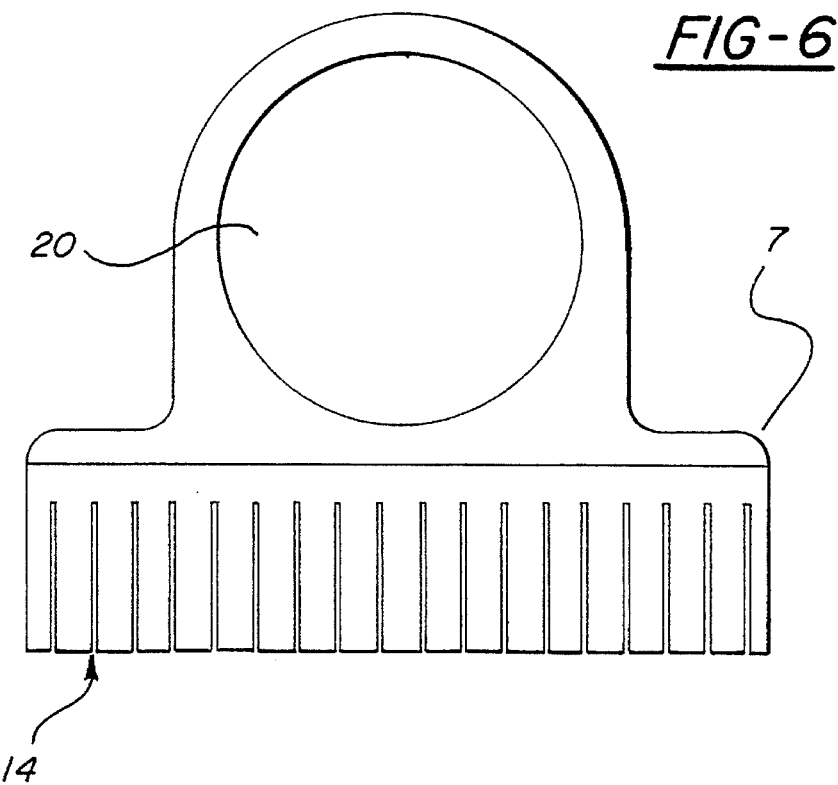
FIG. 6, is a top view of a preferred embodiment of the electrode tab collecting comb of the present invention.

FIG. 6, shows a top view of a preferred embodiment of the electrode tab collecting comb 7 of the present invention having electrode tab collecting slots 14. The electrode tabs are collected into collecting slots 14 and can be held by friction, welding, or brazing. FIG. 6 also shows the battery terminal connector opening 20 in the tab collecting comb 7. The battery terminal welding/brazing lip is press fit into the opening 20, and may thereafter be brazed or welded into place if needed or desired.

The tab collecting combs of the present invention reduce the amount of head space in the case necessary to accommodate the electrode tab/battery terminal connection. This has the effect of reducing the overall weight of the battery case. Thus, the volumetric energy density of batteries according to the present invention is increased.

The battery terminals described in the present invention are thinner and of a greater diameter than those of the prior art. As a result, the terminals of the present invention are very efficient dissipaters of heat, and thus contribute significantly to the thermal management of the cell.

The disclosure set forth herein is presented in the form of detailed embodiments described for the purpose of making a full and complete disclosure of the present invention, and such details are not to be interpreted as limiting the true scope of the invention as set forth and defined in the claims below.

We claim:

1. A sealed prismatic battery case comprising:

a case composed of metal;

a lid for said case having an annular shroud defining the periphery of at least one opening through said lid:

at least one terminal having a sealing lip around its circumference and an axial opening therethrough, said at least one terminal crimp sealed into said annular shroud at said sealing lip; and a pressure vent for releasing internal pressure of said case to the surrounding atmosphere, said pressure vent affixed in said axial opening of said at least one terminal, said pressure vent comprising:

a vent housing having a hollow interior area in gaseous communication with said surrounding atmosphere and the interior of said case via said at least one opening, a pressure release piston positioned within said hollow interior area, said pressure release piston sized to seal said axial opening and having a seal grove on its surface opposite said axial opening a seal mounted in said seal grove, said seal groove configured to encapsulate all but one surface of said seal thereby, leaving the non-encapsulated surface of said seal exposed, and a compression spring positioned to urge said pressure release piston to compress said seal in said seal groove and block said axial opening in said terminal.

2. The sealed battery case claimed in claim 1, further comprising a seal positioned between said sealing lip and said annular shroud.

3. The battery case claimed in claim 1, further comprising at least one comb forming an electrical connection between internal electrode tabs and said at least one terminal.

4. The battery case claimed in claim 3, wherein said at least one comb is an electrically conductive bar having multiple parallel slots into which said internal electrode tabs are friction fit.

5. The battery case claimed in claim 4, wherein said at least one comb is formed of copper or a copper alloy.

6. The battery case claimed in claim 2, wherein said case, said lid, and said annular shroud are formed of 304L stainless steel.

7. The battery case claimed in claim 5, wherein said at least one terminal is formed of copper or copper alloy.

8. The battery case claimed in claim 1, wherein said seal comprises a hydrogen impermeable polysulfone material that is elastomeric and dielectric.

* * * * *